United States Patent [19]

Griffiths et al.

[11] Patent Number: 5,100,628
[45] Date of Patent: Mar. 31, 1992

[54] METHOD AND APPARATUS FOR MAKING SEAMLESS BELT PHOTORECEPTORS

[75] Inventors: Clifford H. Griffiths, Pittsford; Henry T. Mastalski, Webster, both of N.Y.

[73] Assignee: Xerox Corporation, Stamford, Conn.

[21] Appl. No.: 636,145

[22] Filed: Dec. 31, 1990

[51] Int. Cl.$^5$ .............................. B05D 5/12
[52] U.S. Cl. .................... 427/121; 156/137; 427/374.1; 427/389.9; 430/69; 430/127; 430/132
[58] Field of Search ............... 427/389.9, 121, 374.1; 156/137, 83; 430/69, 127, 132

[56] References Cited

U.S. PATENT DOCUMENTS

| | | | |
|---|---|---|---|
| 3,861,353 | 1/1975 | Erhart et al. | 118/49.1 |
| 3,914,126 | 10/1975 | Pinsler | 96/1.5 |
| 4,033,768 | 7/1977 | Wieloch | 96/1.5 |
| 4,747,992 | 5/1988 | Sypula et al. | 264/130 |
| 4,761,709 | 8/1988 | Ewing et al. | 361/225 |
| 4,835,807 | 6/1989 | Swift | 355/250 X |
| 4,878,985 | 11/1989 | Thomsen et al. | 156/459 |
| 4,959,109 | 9/1990 | Swain et al. | 156/73.4 |
| 5,021,109 | 6/1991 | Petropoulos et al. | 156/137 |

Primary Examiner—Michael Lusignan
Attorney, Agent, or Firm—Kenyon & Kenyon

[57] ABSTRACT

A method and apparatus for coating photoreceptors used in copying machines. Prior to coating, an elastically deformable material is placed about the external surface of a mandrel to accommodate the belt. The thickness of the material is such that when the belt is pushed over the mandrel the deformable material is deformed and engages the interior surfaces of the belt facing the mandrel. As a result of heating and cooling steps involved during the coating process, the belt contracts and expands differently than the mandrel. The deformable material deforms accordingly to maintain consistent contact throughout between it and the undersurface of the belt.

28 Claims, 1 Drawing Sheet

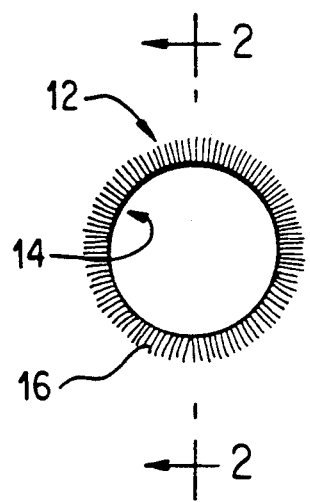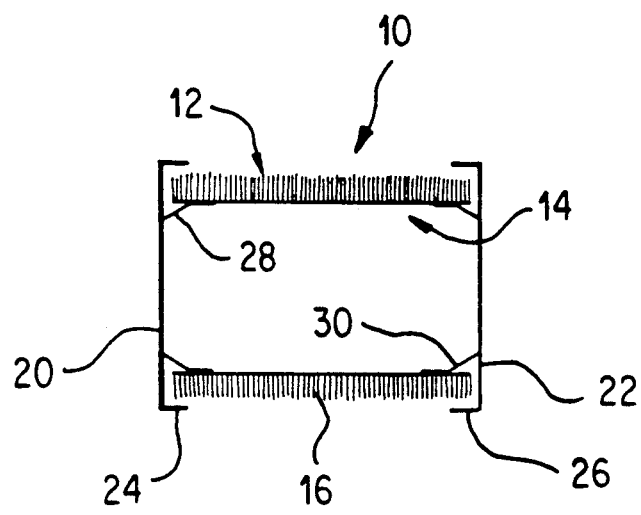

METHOD AND APPARATUS FOR MAKING SEAMLESS BELT PHOTORECEPTORS

BACKGROUND AND DISCLOSURE OF THE INVENTION

In forming photoreceptor belts lamination may be employed by applying alternate layers of thermoplastic sheets and reinforcing fabrics. Another method of forming said belts is by molding which unfortunately often results in flashing that requires removal to achieve a smooth outer surface.

In employing the coating technique the belt is mounted on a mandrel and coated with a single or multiple layer polymeric or non-polymeric having a solvent base to provide a seamless belt. During the coating process the belt and the mandrel are subjected to several heating and cooling steps.

More recently these belts have been formed by applying uniform fluid coating of polymeric film on a cylindrical mandrel, solidifying the fluid coating to form a uniform solid coating and separating the uniform solid coating from the mandrel. During the forming step, both the mandrel and the belt are subjected to a heating step that results in expansion of the coating and the mandrel.

Where the coating step involves solvent soluble polymers, solvent evaporation from the coated solution can cause significant cooling of the belt substrate. After each coating process the mandrel and belt are cycled through a heated oven to remove residual solvents. This cooling and heating effect can have adverse effects on the belt formed because the seamless belt and the mandrel have different thermal characteristics. The problem is that the mandrel made of solid metal, solid plastics or flexible metal, has thermal characteristics that do not match those of the belt. As a result, the uniform contact between the belt and the mandrel is not always maintained. Consequently, the desired structural uniformity is also deficient.

The film forming polymer material is deposited in fluid form, preferably by spraying on the mandrel. The coating is then heated to drive off residual solvent. The effect when using a metal mandrel causes the belt with its coating to expand more than the mandrel. Upon cooling the belt with coating will contract at a rate greater than that of the metal mandrel. Because of the differences in expansion and contraction, contact between the belt and the mandrel is not necessarily maintained in a consistent manner.

If the belt substrate is not held in a relatively constant disposition relative to the mandrel, the deposition may be distorted. Similarly, where thermal characteristics are uneven, uniformity may be lost in coating. In both instances the belt ultimately formed may have inconsistent electrical characteristics, adversely affecting the copier performance. These problems can occur regardless of the deposition technique used.

SUMMARY OF THE INVENTION

The invention relates to an apparatus and a process for overcoming the deficiencies noted above. Prior to the belt coating steps an elastically deformable material is placed about the external surface of the mandrel to accommodate the belt. The thickness of deformable material is such that when the belt is pushed over the mandrel the deformable material is deformed and engages the interior surface of the belt facing the mandrel. The characteristics of this deformable material are such that during the heating and cooling processes, as the belt contracts and expands differently than the mandrel, the deformable material deforms accordingly to maintain consistent contact throughout between it and the undersurface of the belt.

In the discussion of the preferred embodiment which follows this deformable material is a pile fabric made from a polymeric material and bonded to a nickel mandrel. The ends of the mandrel are covered with caps which have extensions for masking the outer edges of the belt being coated.

This apparatus permits coating, including the heating and cooling steps, while maintaining consistent thermal contact between the belt and the mandrel and uniform belt temperature. The pile deflection is sufficient to accommodate the thermal expansion and contraction of the belt material relative to the semirigid basic cylinder of the mandrel With this system both the thermal history and physical location of the belt are uniform. This enhances the coating process and insures that the belt has uniform electrical properties when used in a xerographic copier.

The above has been a brief discussion of deficiencies of the prior art and advantages of the invention. Other advantages can be perceived from the detailed discussion of the preferred embodiment by those skilled in the art.

BRIEF DESCRIPTION OF THE DRAWINGS

FIG. 1 is a cross-sectional view of the mandrel with the belt having been secured thereto.

FIG. 2 is a cross-section of FIG. 1 taken along lines 2—2.

DETAILED DISCUSSION OF THE PREFERRED EMBODIMENT

As can be seen in FIG. 1, the mandrel belt assembly 10 is shown with the belt 12 supported on mandrel 14 in the desired position for subjecting the belt to the coating process. The substrate belt 12 is normally in the range of 5-15 inches diameter and between 10-15 inches wide. Prior to belt 12 being placed on mandrel 14, mandrel 14 is formed to have the desired cylindrical configuration for supporting fabric, as well as the belt, in subsequent coating processes. In this instance mandrel 14 is a right circular cylinder formed of electro-deposited nickel. The mandrel can be made of other materials such as high temperature plastic or other metals.

Pile fabric 16 is then secured to the mandrel to completely circumscribe the mandrel outer surface as shown. Pile fabric 16 (brush fabric, similar in construction to velvet or pile carpet) is adhesively bonded to the outer surface of the mandrel. Although the pile can be formed of any material which has the desired characteristics, in this case the pile fiber is preferably monofilament rather than a stable fiber in order to avoid contamination of the coatings by lint fibers. The length and density of the pile fibers in their mechanical characteristics control the ease of the belt mounting and the degree of support provided for the belt. In this instance the fabric used is a 0.29 inch thick brush fabric woven from DuPont "Nomex" Aramid fiber by the Schlegel Corporation, bonded to the nickel with a 3M high temperature adhesive. The diameter of the mandrel is such a 20% reduction in pile height results when the belt is mounted thereon. The Nomex fiber is chosen for its excellent thermal stability. The mandrel structure is thermally insulating and maintains its thermal and mechanical characteristics over the processing range required for photoreceptive fabrication of about between 0° C. and 140° C.

Once belt 12 is properly disposed on mandrel 14 with the pile fabric, it is subjected to the coating process. Belt 12 can be sleeved over the mandrel manually or by vacuum handling devices. The diameter of outer pile on the cylinder is such that when the belt 12 is pushed over the mandrel 14, causes the fibers 1 to be slightly away from equilibrium angle (approximately normal) to the cylindrical mandrel surface During coating multilayer organic solvent based coatings are applied to the seamless belt substrate. Spray coating is the current coating technique used in this technology. During the coating process solvent evaporation from the coating solution can cause significant cooling of the substrate belt. This results in contracting of belt 12 on the mandrel 14. During the cooling steps with the system shown, the pile deflection is sufficient to accommodate the contraction. During expansion the pile tends to seek its normal state maintaining contact between the pile material and the belt. In this manner, efficient contact is always maintained during the coating processes between the mandrel, specifically the pile fabric, and the underside of the belt.

Various coating systems can be used with this particular apparatus. Usually these coating systems involve application of a polymer material by spraying on to the belt and subsequently heating the material to cure it. After the curing step is completed, cooling occurs naturally or by external cooling means. These steps can be repeated several times until the desired thickness or combination of coating materials is obtained. An example of these manufacturing steps are shown in U.S. Pat. No. 4,747,992 issued to Sypula et al. incorporated herein by reference.

As shown in FIG. 1, end caps 20 and 22 are arranged over each end of mandrel 14. Each cap 20, 22 has annular flanges 24, 26 respectively, that extends entirely about the periphery of belt 12 and marks a portion of the belt to control the width of the belt being coated and avoid contamination of fibers during coating. Caps 20, 22 also have spring members 28, 30 for engaging the internal surfaces of mandrel 14. Spring members 28, 30 are biased outwardly such that they must be deflected for insertion into the mandrel 14. The bias of spring members 28, 30 is sufficient to hold end caps 20, 22 in place, although other means could be used as well. These caps can then be fixed to a shaft or other rotatable means to rotate mandrel 14 during the coating steps.

What is claimed is:

1. A method for coating a substrate comprising:
   (a) arranging a deformable material on a substantially rigid sleeve over substantially the entire outer surface of the sleeve;
   (b) mounting over said sleeve a belt substrate having a diameter less than that of the deformable material but greater than that of the sleeve, said deformable material being sufficient to permit thermal contracting and expansion of the belt relative to the sleeve during the coating process with loss in contact;
   (c) coating said belt with a polymeric material, heating said coated belt to cure the polymeric material, and cooling said belt to form a photoreceptor belt for use in a xerographic copying machine.

2. The method according to claim 1 wherein said deformable material is a pile fabric.

3. The method according to claim 2 wherein said belt substrate is flexible material.

4. The method according to claim 3 wherein said belt has a diameter between 5 and 15 inches.

5. The method according to claim 2 wherein said pile fabric is a woven pile fabric.

6. The method according to claim 5 wherein said pile fabric is thermally conductive.

7. The method according to claim 5 wherein said pile is electrically conductive.

8. The method according to claim 7 wherein said pile fabric is a woven metal pile brush fabric.

9. The method according to claim 8 wherein said belt has a width of between 10 and 15 inches.

10. The method according to claim 9 wherein said pile fabric is a monofilament material.

11. The method according to claim 10 wherein the ends of said mandrel are covered with a portion of the belt being masked before said belt is subjected to said coating step.

12. The method according to claim 11 wherein said sleeve is a right circular cylinder of electro-deposited nickel.

13. The method according to claim 12 wherein said fabric is bonded to said electro-deposited nickel outer surface of said sleeve with an adhesive.

14. The method according to claim 13 wherein said mounting step results in an approximately 20% reduction in pile height.

15. The method according to claim 14 wherein said coating step includes application of a polymeric material to said substrate belt while secured onto said mandrel.

16. An apparatus for coating a substrate comprising:
   (a) a rigid sleeve having an inner surface and an outer surface;
   (b) a deformable material over substantially the entire outer surface of said sleeve;
   (c) a photoreceptor belt substrate having a diameter less than that of the deformable material but greater than that of the sleeve, said deformable material being sufficient to permit thermal contracting and expansion of the belt relative to the sleeve during the coating process with hosing contact;
   (d) means for coating said belt with a coating material, for heating said coated belt to cure the polymeric material, and for cooling said belt to form a photoreceptor belt for use in a xerographic copying machine.

17. The apparatus according to claim 16 wherein said deformable material is a pile fabric.

18. The apparatus according to claim 17 wherein said belt substrate is flexible material.

19. The apparatus according to claim 18 wherein said belt has a diameter between 5 and 15 inches.

20. The apparatus according to claim 19 wherein said pile fabric is a woven pile fabric.

21. The apparatus according to claim 20 wherein said pile fabric is thermally conductive.

22. The apparatus according to claim 21 wherein said pile is electrically conductive.

23. The apparatus according to claim 22 wherein said pile fabric is a woven metal pile brush fabric.

24. The apparatus according to claim 23 wherein said belt has a width of between 10 and 15 inches.

25. The apparatus according to claim 24 wherein said pile fabric is a monofilament material.

26. The apparatus according to claim 25 wherein the ends of said mandrel are covered with a portion of the belt being masked.

27. The apparatus according to claim 26 wherein said sleeve is a right circular cylinder of electro-deposited nickel.

28. The apparatus according to claim 27 wherein said fabric is bonded to said electro-deposited nickel outer surface of said sleeve with an adhesive.

* * * * *

UNITED STATES PATENT AND TRADEMARK OFFICE
CERTIFICATE OF CORRECTION

PATENT NO. : 5,100,628
DATED : March 31, 1992
INVENTOR(S) : Clifford H. Griffithe et al It is certified that error appears in the above-indentified patent and that said Letters Patent is hereby corrected as shown below:

| Column | Line | |
|--------|------|---|
| 1 | 5 | Change "DISCLOSURE" to --DISCUSSION--. |
| 2 | 66 | After "such" insert --that--. |
| 3 | 11 | After "14," insert --this--. |
| 3 | 36 | Change "are" to --is--. |
| 3 | 63 | Change "with" to --without--. |
| 4 | 46 | Change "with hosing" to --without losing--. |

Signed and Sealed this

Twelfth Day of April, 1994

Attest:

Attesting Officer

BRUCE LEHMAN

Commissioner of Patents and Trademarks